United States Patent [19]

Lyon et al.

[11] 4,313,419
[45] Feb. 2, 1982

[54] SOLAR HEATING SYSTEM

[75] Inventors: Floyd A. Lyon, Brookville; William H. Yale; Donald Lyon, both of Locust Valley, all of N.Y.

[73] Assignee: Halm Instrument Co., Inc., Glen Head, N.Y.

[21] Appl. No.: 142,337

[22] Filed: Apr. 21, 1980

[51] Int. Cl.³ .................................................. F24J 3/02
[52] U.S. Cl. .................................... 126/421; 126/400; 126/437
[58] Field of Search ............... 126/437, 419, 421, 422, 126/430, 436, 400; 165/18

[56] References Cited

U.S. PATENT DOCUMENTS

| | | | |
|---|---|---|---|
| 4,008,709 | 2/1977 | Jardine | 126/437 |
| 4,021,895 | 5/1977 | Morse | 126/400 |
| 4,044,949 | 8/1977 | Morawetz et al. | 126/400 |
| 4,054,124 | 10/1977 | Knoos | 126/437 |
| 4,126,122 | 11/1978 | Bross | 126/400 |
| 4,144,999 | 3/1979 | Zebuhr | 126/437 |
| 4,172,442 | 10/1979 | Boblitz | 126/437 |
| 4,235,223 | 11/1980 | Coxon | 126/422 |
| 4,248,049 | 2/1981 | Briley | 126/437 |

Primary Examiner—Daniel J. O'Connor
Attorney, Agent, or Firm—James P. Malone

[57] ABSTRACT

Solar heating system. A solar connector. A double storage device connected to the collector to provide coolest possible heat transport medium at beginning of each day's collection and to control collector input temperature at minimum temperature and hence maximum collection efficiency. The first storage device has a capacity for approximately one days operation. The second storage device has a capacity for several days operation. The operation of the storage devices are controlled so that the first storage device is heated first and when the first storage device is heated sufficiently then the second storage device is heated. The operation of the storage devices are also controlled so that the first storage device is used first for heating and when the first storage device is depleted of useable heat then the second storage device is used.

2 Claims, 3 Drawing Figures

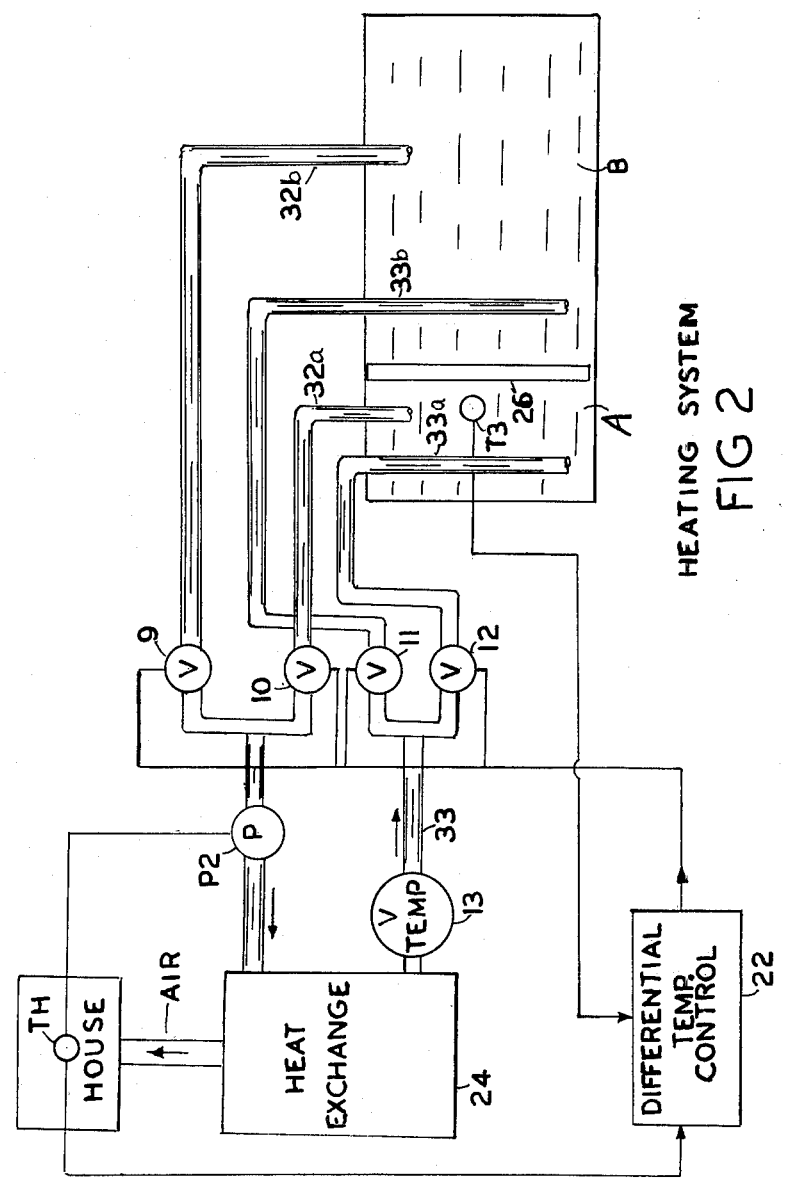

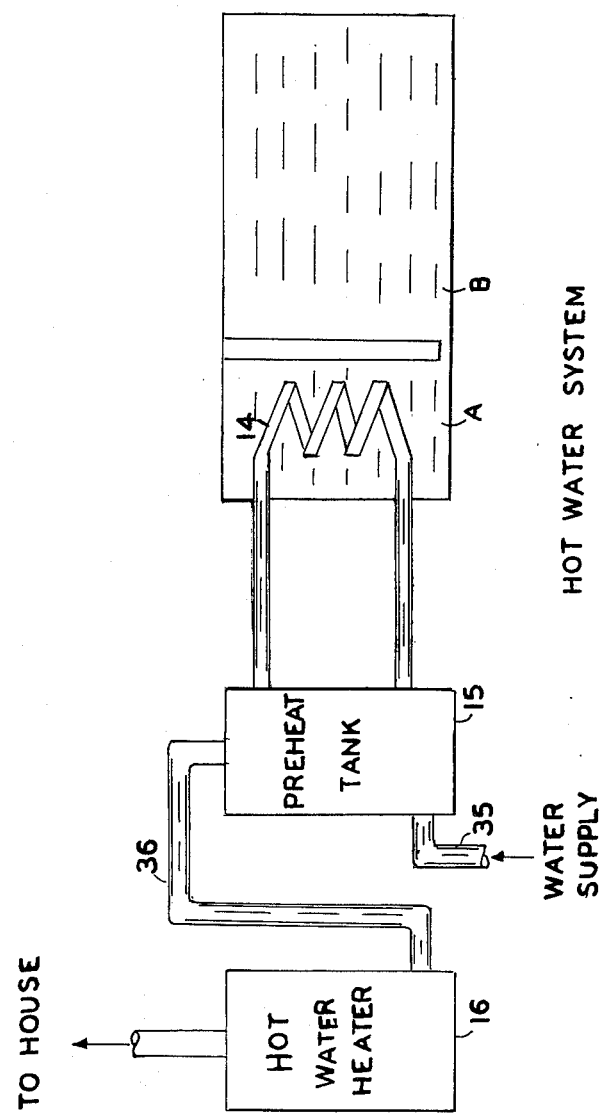

SOLAR HEATING SYSTEM

TECHNICAL FIELD

This invention relates to solar heating systems and more particularly to such systems using two heat storage devices.

BACKGROUND ART

Convention solar heating systems generally use one heat storage device.

DISCLOSURE OF THE INVENTION

The present invention has been configured using the two heat storage tanks with a liquid for heat storage and a liquid for heat transport. However, other storage devices and heat transport mediums, such as rock beds and air, will perform equally as well. The system description is based on the present configuration. The first storage tank is large enough to supply needed heating for approximately one average winter day when heated to a moderate temperature, and the second tank is considerably larger and sufficient to supply needed heating for a number of days and may be heated to a high temperature for maximum storage. For instance, the second tank may be the order of twenty times the size of the first tank.

In the double tank system of the present invention, the smaller tank, operating on a daily cycle under normal conditions is heated first. If the smaller tank temperature rises sufficiently so that it equals the larger tank temperature, the larger tank is heated, thus minimizing the maximum collection temperature and maximizing the collection efficiency. The heat is drawn from the smaller tank first, until its temperature falls to the minimum required by the heating system, at which point the larger tank is used. This lowers the smaller tank temperature to the minimum possible, thus providing the coldest possible liquid for collection and hence the highest possible collection efficiency. Therefore the collector may be made smaller than in conventional systems to supply the same amount of heat.

The primary object of this invention is to provide greatly increased solar system efficiency, thus reducing the collection area required and/or reducing the heat storage required for a given heating requirement.

Another object of this invention is to provide space heating that is uniform irrespective of storage tank temperature.

Another object of the invention is to provide a heating system having means to return the water to the storage tank at the lowest useable temperature.

Another object of the invention is to provide domestic hot water at useable temperature in conjunction with space heating.

Another object of the invention is to provide apparent tank temperature stratification and minimum collector temperature for increased collection efficiency.

Another object of the invention is to provide new and improved solar heating collection system comprising: a solar collector, a double tank connected to the collector to provide coolest water to the collector at the beginning of each sunny day which gives maximum collection efficiency so as to provide apparent tank temperature stratification, the first tank having a capacity for one days operation at moderate temperature, the second tank having a capacity for several days operation, and means to control operation of the tanks so that the first tank is heated first and when the first tank's water is heated to the temperature of the coolest water in the second tank, then the second tank is heated.

Another object of the invention is to provide new and improved solar heating system comprising: a solar collector, a building heating means, a double tank connected to the collector and the building heating means so as to provide apparent tank temperature stratification at moderate temperature, the second tank having a capacity for several days heating operation, and means to control operation of the tanks so that the first tank is used first and when the first tank is depleted of heat, then the second tank is used.

These and other objects will be apparent from the following specification and drawings of which:

BRIEF DESCRIPTION OF THE DRAWINGS

FIG. 2 is a schematic block diagram of the house heating system of the present invention.

FIG. 3 is a schematic block diagram of the domestic hot water system of the present invention.

BEST MODE FOR CARRYING OUT THE INVENTION

Figure 1:
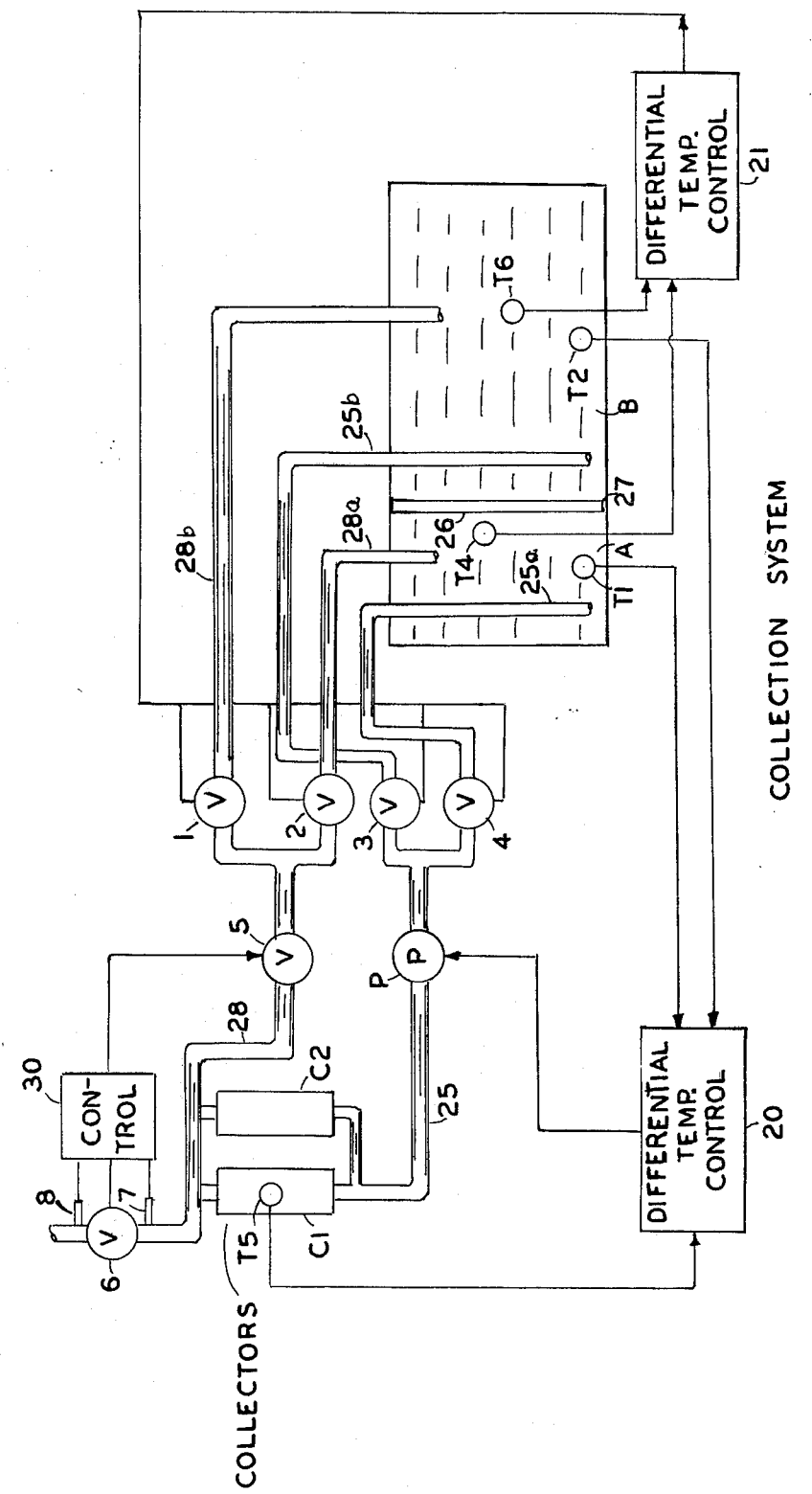
FIG. 1 is a schematic block diagram of the collection system of the present invention.

Referring to FIG. 1, it shows the collection system for the solar collectors, $C_1$ and $C_2$. Water or other liquid is supplied to the collectors $C_1$ and $C_2$ by means of pipe 25, and pump P. Pump P is connected to the bottom of tank A via valve 4 and pipe 25a, or to the bottom of tank B via valve 3 and pipe 25b. The two tanks are separated by an insulated barrier 26, which has a small weep hole 27 at the bottom to equalize liquid level in the tanks.

Water or other liquid is returned from the collectors through the pipe 28, valve 5 and through valve 2 and pipe 28a, to the upper portion of tank A, or through valve 1 and pipe 28b to the upper portion of tank B. Valves 1, 2, 3 and 4 are electrically controlled by differential temperature controller 21, as will be explained in connection with the operation of the system. All differential temperature controllers may be conventional devices which are commercially available, such as manufactured by Hawthorne Industries, Inc. Differential controller 20 is connected to sensors $T_5$ on the collector, $T_1$ in the tank A, or $T_2$ in the tank B. The output of differential temperature controller 20 is connected to operate the pump P. Differential temperature controller 21 is connected to temperature sensor $T_4$ in the tank A, and $T_6$ in tank B. The output of differential temperature controller 21 is connected to operate the valves 1, 2, 3 and 4. Valve 6 connected to the top of the collectors is an air bleeding valve which is operated by liquid sensors 7 and 8, and control 30, as will be explained.

It is noted that the inputs 25a and 25b to the collectors are taken from the bottom of the tanks, it contains the coolest water and therefore provides the greatest collector efficiency. The outputs of the collectors 28a and 28b are returned to the upper portion of the tanks, this enhances the temperature stratification in the tanks.

FIG. 2 shows the heating system in the present invention. It is noted that tanks A and B are the same as in FIG. 1 and the heating system is connected to these tanks in addition to the collection system of FIG. 1.

For daily requirements, water or other liquid is taken from the top of tank A by means of the pipes 32a and fed via valve 10, through the pump $P_2$ and pipe 32, to the conventional heat exchanger 24, which heats the air for the house. The water is returned from the heat exchanger 24 to tank A via the temperature adjusting valve 13, pipe 33, valve 12, and pipe 33a, to the lower portion of tank A. The temperature adjusting valve is conventional as manufactured by Symmons Industries, Inc. It regulates the flow depending on temperature. Valves 9, 10, 11 and 12 are controlled by differential temperature controller 22, which chooses which tank will be connected.

When tank B is being used, water is supplied via pipe 32b valve 9, and pump $P_2$ and pipe 32, to the heat exchanger 24. Water is returned to the tank B through the temperature adjusting valve 13, pipe 33, valve 11 and pipe 33b. The valves 9, 10, 11 and 12 are controlled by the differential temperature control 22, the inputs of which are connected to house thermostat TH and temperature sensor $T_3$, in the central portions of tank A, pump $P_2$ is controlled by house thermostat TH.

FIG. 3 shows the hot water system utilizing the present invention. This system is installed in tank A in addition to the system of FIGS. 1 and 2. Heat is supplied by the pipe coil 14, in tank A, to a pre-heater hot water tank 15. The coil 14 operates on the thermo-siphon principal. The pre-heater tank 15, receives water input from the water source, such as city water at pipe 35. The output of the pre-heater tank 15, is connected by pipe 36 to the conventional hot water heater 16 in the building. Therefore, whatever heat is available from the tank A, pre-heats the water to the conventional heating system and thereby saves energy.

COLLECTION SYSTEM OPERATION—FIG. 1.

1. Differential temperature controller 20, senses collector surface temperature $T_5$ is higher than tank A bottom temperature $T_1$, and turns on pump P. 2. Liquid sensor probes which are conventional, 7 and 8, indicate dry and control 30 causes bleed valve 6 to remain open and fill valve 5 to shut. 3. Pump P fills system. Air bleeds out through bleed valve 6. 4. Liquid sensor probes 7 and 8, both indicate wet when system is full. This condition causes bleed valve 6 to close and fill valve 5 to open, starting normal collection cycle. 5. Concurrent with pump turn on, Step 1, differential temperature control 21 is turned on and senses tank A temperature $T_4$ and tank B, temperature $T_6$. If tank A temperature $T_4$ is greater than tank B, temperature $T_6$, valve 1 is opened, valve 2 is closed, valve 3 is opened and valve 4 is closed, thus collecting into tank B.

If tank A temperature $T_4$ is less than tank B temperature $T_6$ valve 1 is closed, valve 2 is opened, valve 3 is closed and valve 4 is opened, thus collecting into tank A.

This control logic insures that the coldest liquid is always used thus optimizing collector efficiency.

HEATING SYSTEM OPERATION—FIG. 2.

1. House thermostat TH calls for heat.
2. Pump $P_2$ turns on and differential temperature controller 22 is turned on.
3. The temperature controller 22 senses tank A mid level temperature $T_3$. If $T_3$ is less than the minimum temperature required for the heat exchanger, valve 9 opens, valve 10 closes, valve 11 opens and valve 12 closes, thus drawing heat from tank B.

If tank A mid level temperature $T_3$ is greater than the minimum temperature required by the heat exchanger, valve 9 closes, valve 10 opens, valve 11 closes and valve 12 opens, thus drawing heat from tank A.

4. Air temperature level control through the heat exchanger 24 is obtained regardless of liquid temperature above minimum required, by use of temperature adjusting valve 13. This valve is automatically adjusted so that the output liquid temperature remains constant, thus assuring that the liquid temperature returned to the tank is as low as possible, consistant with the heating requirements. Temperature adjusting valve 13 is conventional as manufactured by Symmons Industries Inc.

DOMESTIC HOT WATER SYSTEM OPERATION—FIG. 3.

The present invention has been configured with heat exchanger coil 14 in tank A, operating in the thermosiphon mode. However, any arrangement of the heat exchanger that will provide heat extraction from tank A, such as external mounting with forced circulation of heating liquid and heated water, or internal mounting with forced circulation of heated water, will perform equally as well.

The heat exchanger 14 is connected to the pre-heat hot water tank 15, which is connected to a conventional hot water heater 16.

COMBINED SYSTEM OPERATION

The three system functions, collection, space heating and domestic hot water operate relatively independently of each other. However, overall system efficiency and useage has been increased greatly by use of the following:

1. Double Tank:

The double tank system is a new and novel means of providing apparent tank temperature stratification by minimizing the liquid temperature available to the collectors and thus optimizing collection efficiency.

The two tanks are sized so that the smaller tank, tank A provides collection and heat storage about one days heating requirements. The larger tank B, is sized to provide a greater storage capacity. These tanks are thermally insulated from each other by wall 26. In normal operation, collection and heat removal occur only in the smaller tank A. Since the storage capacity of tank A is only sufficient for about one day, the tank temperature at the start of the daily collection cycle is always the lowest possible, also, tank A is only heated to a moderate temperless than or equal to tank B bottom temperature, thus providing maximum collector efficiency.

In the heating season, during periods of very cold weather and/or no sun, the heating requirements are supplemented by the larger tank B. During periods of warm clear weather, heat is collected into the larger tank B as detailed in Step Five of the collection system operation.

2. Temperature Control Valve on House Heat Exchanger:

The temperature control valve 13 on the output of the house heat exchanger provides two functions:
 1. Uniform air temperature independent of liquid temperature.
 2. Minimum possible liquid temperature returned to storage, thus providing the lowest possible liquid temperature for collection and hence highest possible collection efficiency.

3. Collection Logic:

Collection logic is divided into two phases.

1. Storage Tank cooling.
2. Storage Tank heating.

The description of the system operation as presented to this point has been concerned with phase One—Storage Tank Cooling or Heating Season mode.

Phase Two. Storage Tank Heating, occurs when the heat collected exceeds that required for heating, over a period of time, and storage tank B starts to heat. At this point the control logic is changed so that the following occurs:

1. The collection differential temperature controller 20 compares the collector surface temperature $T_5$ with the tank B bottom temperature $T_2$ for the start of the collection cycle.
2. Temperature sensor $T_4$ senses the mid-level temperature of tank A. If $T_4$ is less than a pre-set value nominally minimum domestic hot water temperature, valve 1 closes, valve 2 opens, valve 3 closes and valve 4 opens, thus collecting into tank A.
3. If $T_4$ is greater than a second pre-set temperature nominally maximum domestic hot water temperature, valve 1, opens, valve 2 closes, valve 3 opens and valve 4 closes, thus collecting into tank B.

This now provides water to preheated tank water at useable temperature rather than partially heated, thus reducing and/or eliminating supplementary domestic hot water heating.

The house heating system is connected to tank B only, by having valves 9 and 11 remain open, and valves 10 and 12 remain closed.

It is claimed:

1. Solar heating collection system comprising:
a solar collector building heating means,
a double storage means comprising first and second storage means connected to the collector and the building heating means,
the first storage means having a capacity for approximately one days operation,
the second storage means having a capacity for several days operation,
and means connected to control operation of the storage means so that the storage means which is coolest is heated first, wherein the first and second storage means are in the same enclosure and have an insulated barrier between them, said insulated barrier being in a fixed location relative to said enclosure.

2. Solar heating system for a building comprising:
a solar collector,
a building heating means,
a double storage means having first and second storage means connected to the collector and the building heating means so as to provide apparent storage means temperature stratification,
the first storage means having a capacity for one days heating operation,
the second storage means having a capacity for several days heating operation,
and means to control operation of the storage means so that the first storage means is used first and when the first storage means is depleted of useable heat then the second storage means is used, wherein the first and second storage means are in the same enclosure and have an insulated barrier between them, said insulated barrier being in a fixed location relative to said enclosure.

* * * * *